United States Patent
Altmann et al.

(10) Patent No.: US 12,518,938 B2
(45) Date of Patent: Jan. 6, 2026

(54) METHOD FOR DETECTING THE SWITCHING STATE OF A SWITCHING CONTACT OF AN ELECTROMECHANICAL SWITCHING DEVICE, THE SWITCHING CONTACT HAVING AT LEAST ONE PAIR OF CONTACTS, AND CIRCUIT ASSEMBLY FOR DETECTING THE SWITCHING STATE

(71) Applicant: Phoenix Contact GmbH & Co. KG, Blomberg (DE)

(72) Inventors: Matthias Altmann, Bad Pyrmont (DE); Tobias Langer, Lemgo (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 110 days.

(21) Appl. No.: 18/255,893

(22) PCT Filed: Dec. 6, 2021

(86) PCT No.: PCT/EP2021/084422
§ 371 (c)(1),
(2) Date: Jun. 5, 2023

(87) PCT Pub. No.: WO2022/122665
PCT Pub. Date: Jun. 16, 2022

(65) Prior Publication Data
US 2024/0029979 A1    Jan. 25, 2024

(30) Foreign Application Priority Data
Dec. 8, 2020 (BE) .................................. 2020/5888

(51) Int. Cl.
*G01R 31/327* (2006.01)
*H01H 9/54* (2006.01)
*H01H 47/00* (2006.01)

(52) U.S. Cl.
CPC ....... *H01H 47/002* (2013.01); *G01R 31/3278* (2013.01); *H01H 9/54* (2013.01)

(58) Field of Classification Search
CPC ..... H01H 47/002; H01H 9/54; G01R 31/3278
See application file for complete search history.

(56) References Cited

U.S. PATENT DOCUMENTS

2001/0039626 A1  11/2001  Jauert
2016/0146889 A1   5/2016  Voss
(Continued)

FOREIGN PATENT DOCUMENTS

DE    4318188 A1   12/1994
DE    20008548 U1   8/2000
(Continued)

*Primary Examiner* — Walter L Lindsay, Jr.
*Assistant Examiner* — Milton Gonzalez
(74) *Attorney, Agent, or Firm* — LEYDIG, VOIT & MAYER, LTD.

(57) ABSTRACT

A method of detecting a switching state of a switching contact of an electromechanical switching device, the switching contact having at least one pair of contacts, during an operating phase for detecting the switching state, includes: applying a switching current to the switching contact; and analyzing the switching current using an evaluation unit to determine whether the switching contact is in a closed switching state or in an open switching state. A switching current in a form of a clocked voltage or current signal is applied to the switching contact.

10 Claims, 2 Drawing Sheets

(56) References Cited

U.S. PATENT DOCUMENTS

2019/0057827 A1* 2/2019 Khan .................... H01H 47/22
2021/0223317 A1  7/2021 Scholz et al.

FOREIGN PATENT DOCUMENTS

| DE | 102009015605 A1 * | 10/2010 | ................ B61L 1/20 |
| DE | 102012207592 A1 * | 11/2013 | ............. H01H 1/605 |
| DE | 102013106487 A1 | 12/2014 | |
| DE | 102018114425 A1 | 12/2019 | |

* cited by examiner

METHOD FOR DETECTING THE SWITCHING STATE OF A SWITCHING CONTACT OF AN ELECTROMECHANICAL SWITCHING DEVICE, THE SWITCHING CONTACT HAVING AT LEAST ONE PAIR OF CONTACTS, AND CIRCUIT ASSEMBLY FOR DETECTING THE SWITCHING STATE

CROSS-REFERENCE TO PRIOR APPLICATIONS

This application is a U.S. National Phase application under 35 U.S.C. § 371 of International Application No. PCT/EP2021/084422, filed on Dec. 6, 2021, and claims benefit to Belgian Patent Application No. BE 2020/5888, filed on Dec. 8, 2020. The International Application was published in German on Jun. 16, 2022 as WO/2022/122665 under PCT Article 21(2).

FIELD

The present invention relates to a method for detecting the switching state of a switching contact of an electromechanical switching device, the switching contact having at least one pair of contacts, wherein a switching current is applied to the switching contact during an operating phase for detecting the switching state and the switching current is analysed using an evaluation unit to determine whether the switching contact is in a closed switching state or in an open switching state.

BACKGROUND

An assembly for detecting the switch position of a mains switch for microprocessor-controlled devices with switch-off delay is known from document DE 200 08 548 UI. This document describes a mains switch containing two switches connected in series that can only be opened or closed together, one of the switches being connected to one of the two live or (neutral) conductors via one of its contacts and via its other contact to a first input of a sensor which, when voltage is applied and the mains switch is switched on, conducts a measuring current to the second input of the sensor which is connected to the associated other one of the two live or (neutral) conductors. On its output side, the sensor transmits an output signal to a microprocessor of the device, the output signal corresponding to the switch position of the mains switch.

SUMMARY

In an embodiment, the present invention provides a method of detecting a switching state of a switching contact of an electromechanical switching device, the switching contact having at least one pair of contacts, during an operating phase for detecting the switching state, the method comprising: applying a switching current to the switching contact; and analyzing the switching current using an evaluation unit to determine whether the switching contact is in a closed switching state or in an open switching state, wherein a switching current in a form of a clocked voltage or current signal is applied to the switching contact.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
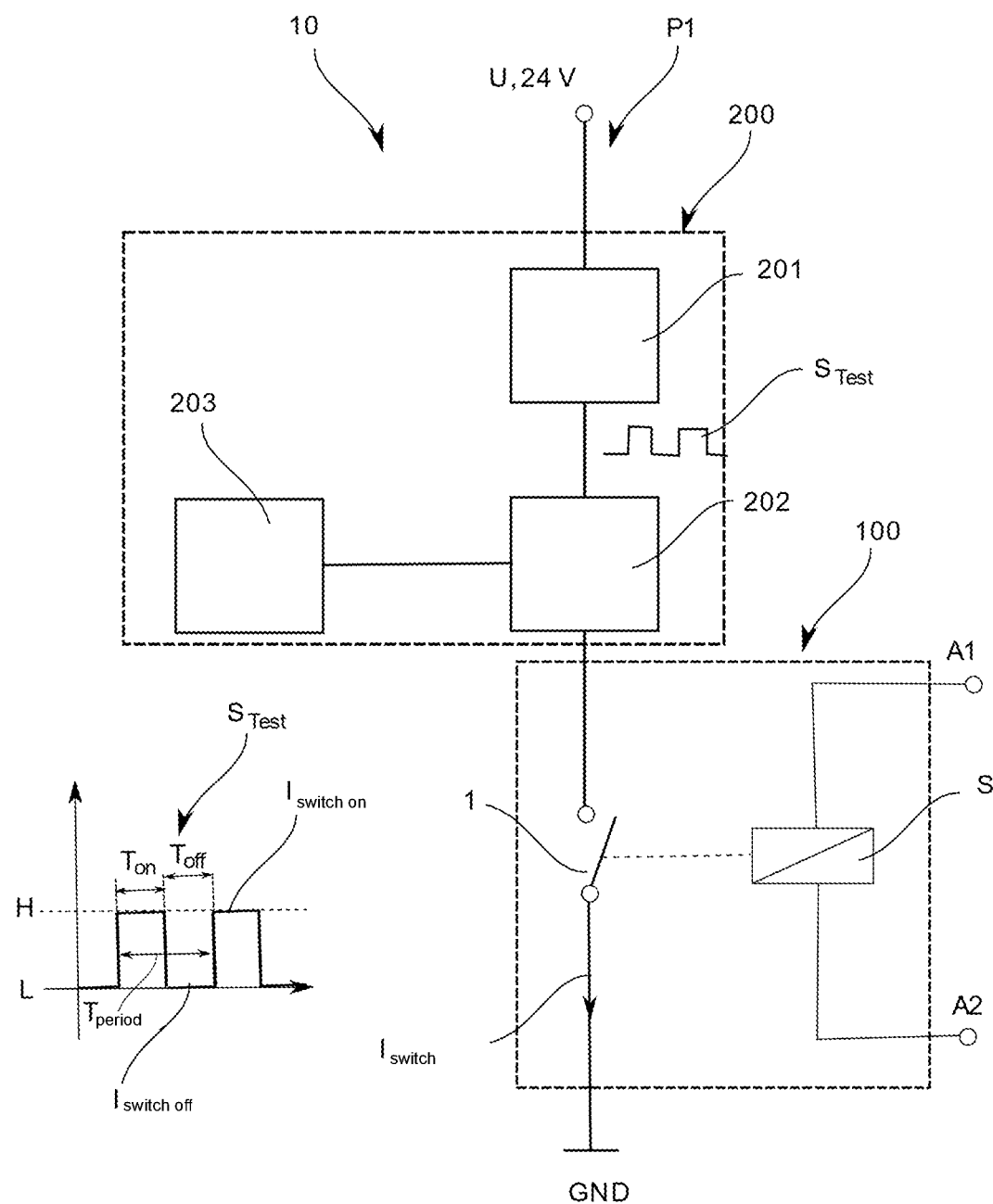
FIG. 1 is a schematic representation of a circuit assembly for detecting the switching state of a switching contact of an electromechanical switching device in a possible embodiment of the invention.

In an embodiment, the present invention provides a method for detecting the switching state of a switching contact of an electromechanical switching device and a circuit assembly for detecting the switching state of a switching contact, wherein the circuit assembly is optimised for reduced power dissipation, whereby better thermal management is also achieved.

In an embodiment, the present invention provides a method for detecting the switching state of a switching contact of an electromechanical switching device, the switching contact having at least one pair of contacts, wherein during an operating phase for detecting the switching state a switching current is applied to the switching contact and the switching current is analysed using an evaluation unit to determine whether the switching contact is in a closed switching state or in an open switching state. According to the invention, a switching current in the form of a clocked voltage or current signal is applied to the switching contact during the operating phase to detect the switching state of the switching contact. In contrast to operating methods in which a required minimum power is permanently applied to the switching contacts while the state is being detected, this is to advantage in that power dissipation is reduced during the operating phases in which the switching state of the switching contacts is being detected, so that the heat input into the switching device is reduced. However, it is still necessary to apply a prescribed minimum power to the switching contacts so that safe contacting can always be ensured. Any impurities on the switch contacts are thus reliably removed. For example, 24-V relays with gold contacts require power of 24 V and 1 mA. This results in power dissipation, both at the output driver and at the relay contacts, which can be considerably reduced by the method according to the invention and by the circuit assembly according to the invention.

According to an advantageous embodiment of the invention, it can be provided that a switching current in the form of a clocked square-wave signal is applied to the switching contact. A predefined maximum switching current is switched during the pulse phase and a predefined minimum switching current is switched during the pause phase. Since the preferred pulse-pause ratio is 1:1, the power dissipation as well as the associated heat input within the switching device are considerably reduced. The heat input can be further reduced by further decreasing the turn-on time. The minimum switching current is advantageously zero. This allows further variable possibilities for reducing power dissipation.

According to a further preferred refinement of the invention, it can also be provided that a switching current in the form of a clocked square-wave signal with variable pulse-pause ratio is applied to the switching contact. As a result, the power dissipation reduction can be adjusted to corresponding basic conditions.

Preferably, the pulse-pause ratio can be varied subject to at least one operating parameter, so that the power dissipation reduction can be directly and operably coupled to the power dissipation generated in the switching device while the switching state of the switching contacts is being detected.

According to another particularly preferred embodiment of the invention, it can be provided that the pulse-pause ratio is preset such that different rates can be specified for detecting the switching state of the switching contact. Depending on the field of application of the switching device, this enables a corresponding adaptation to the operating mode of the switching device and/or to the customer's requirements and/or the electromechanical switching contact used (e.g. relay).

Furthermore, the invention may also be refined such that the period of the clocked current or voltage signal (test signal) is varied subject to at least one operating parameter.

In a likewise preferred embodiment of the invention, it can also be provided that, prior to a switching current in the form of a clocked current signal being applied to the switching contact, a non-clocked switching current of fixed magnitude is applied to the switching contact for a predefined self-cleaning time, wherein the switching contact will not enter the clocked mode before that time has elapsed. As a result, an improved cleanliness of the contacts can be ensured without generating unnecessary power dissipation.

In an embodiment, the invention provides a circuit assembly for detecting the switching state of a switching contact of an electromechanical switching device. The switching device according to the invention is particularly suitable for applying the method according to the invention and comprises an electromechanical switching device having at least one switching contact as well as an evaluation and control unit for actuating the electromechanical switching device and for evaluating a switching current flowing through the switching contact of the electromechanical switching device. According to the invention, the evaluation and control unit is configured such that, during an operating phase for detecting the switching state of the switching contact, a switching current in the form of a clocked current signal can be applied to the switching contact and the switching current can be analysed to determine whether the switching contact is in a closed switching state or in an open switching state.

The evaluation and control unit advantageously comprises a clock signal generating device, a coupling unit, and an evaluation unit, wherein the switching contact of the electromechanical switching device is connected in series with the clock signal generating device and the coupling unit along a common path between a switching voltage potential and ground. Therein, the circuit assembly is configured such that, in an operating cycle for detecting the switching state of the switching contact, a switching current in the form of a clocked current signal can be applied to the switching contact, and the switching current flowing along the common path can be analysed using the evaluation unit to determine whether the switching contact is in a closed switching state (on) or in an open switching state (off).

According to a further preferred embodiment of the subject matter of the invention, it can be provided that the clock signal generating device comprises a control unit and a semiconductor switch that can be actuated via the control unit and is connected in series with the switching contact along the current path of the latter.

Alternatively, the clock signal generating device can also be formed by a clocked current-resistant signal output of a computer or a microprocessor.

Finally, the invention can also be applied in an advantageous manner in that the coupling unit is configured to ensure a limitation of the current along the path of the switching contact and to detect the clocked switching current flowing across the switching contact or the voltage applied across the switching contact and to supply it to the evaluation unit, so that the state of the switching contact can be detected subject to the detected switching current signal.

In summary, the relay contacts or the switching contacts of the electromechanical switching device are loaded with a clocked signal. The high level of the signal corresponds to the switching voltage and the switching current while the low level corresponds to the low-energy or de-energised state. Depending on the set pulse-pause ratio, the resulting power dissipation per period is significantly reduced compared to a continuous signal within the same time period. Therein, the output driver is preferably actuated and clocked by a microcontroller.

FIG. 1 is a schematic representation of a circuit assembly 10 for detecting the switching state of a switching contact 1 of an electromechanical switching device 100 in a possible embodiment of the invention. The circuit assembly 10 shown comprises an electromechanical switching device 100 in the form of a relay or a contactor or the like with a coil S, to which a voltage can be applied via two coil terminals A1, A2, as well as a switching contact 1. Furthermore, the circuit assembly 10 comprises an evaluation and control unit 200 connected in series with the switching contact 1 along the current path P1 for controlling the electromechanical switching device 100 and for evaluating a switching current $I_{switch}$ flowing through the switching contact 1 of the electromechanical switching device 100. Therein, the evaluation and control unit 200 is configured (or set up) such that, during an operating phase for detecting the switching state of the switching contact 1, a switching current $I_{switch}$ in the form of a clocked current signal can be applied to the switching contact 1 and the switching current $I_{switch}$ can be analysed to determine whether the switching contact 1 is in a closed switching state or whether the switching contact 1 is in an open switching state. Therein, the test signal $S_{test}$ generated for this purpose using a clock signal generating device 201 is formed as a square-wave signal and, in the example shown, has a pulse-pause ratio of approximately 1:1. During the pulse phase, a predefined maximum switching current $I_{switch\_on}$ is switched as a high signal H, and during the pause phase $T_{off}$ a predefined minimum switching current $I_{switch\_off}$, for example in the form of a zero signal (low signal L), in particular a minimum switching current $I_{switch\_off}$ of 0 mA is switched, so that power dissipation is reduced accordingly during the operating phase in which the state of the switching contact 1 is being detected.

If, for example, the switching voltage and the switching current for a 24-V relay with gold contacts are 24 V and 1 mA, this results in a required power of 24 V*1 mA=24 mW—while a (non-clocked) signal is permanently applied. With a clocked test signal having a pulse-pause ratio of 1:1 (50%), power dissipation would only be 25 V*1 mA*0.5=12 mW (50%). The pulse-pause ratio and the period are adjusted according to the application and can assume different values during operation depending on the respective situation. Exemplary procedure according to FIG. 2:

Microcontroller clock output (control unit 2011) active.

MOSFET (semiconductor switch 2012) connects 24 V.

When the switching contact 1 of the relay (electromechanical switching device 100) is closed, a current flows through the input module (coupling unit 202) and the switching contact 1.

The microcontroller input module senses whether a high signal H or a low signal L (H if the contact is closed, otherwise L) is applied.

Microcontroller clock output (control unit 2011) inactive.

MOSFET (semiconductor switch 2012) becomes non-conductive.

This is the essential sequence within a switching cycle.

Figure 2:
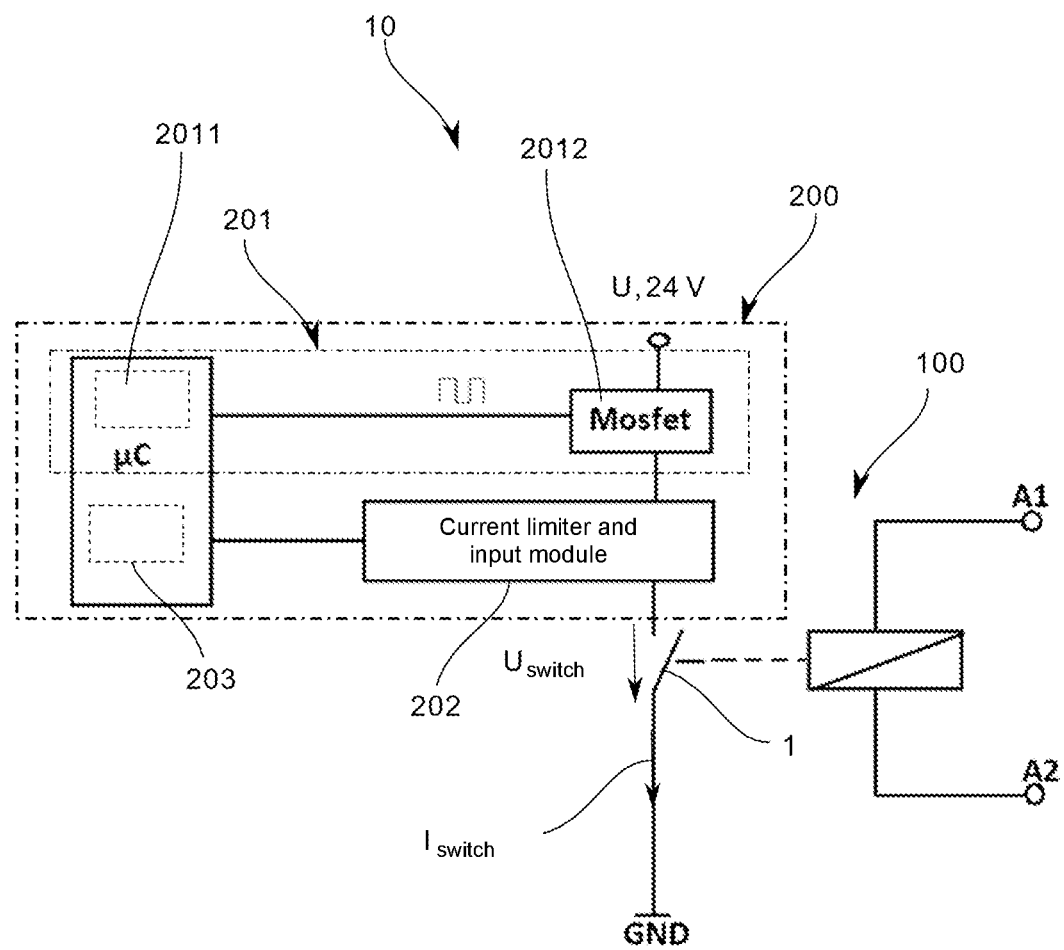
FIG. 2 is a schematic representation of a circuit assembly for detecting the switching state of a switching contact of an electromechanical switching device, modified in comparison to the embodiment according to FIG. 1.

FIG. 2 is a schematic representation of a circuit assembly 10 for detecting the switching state of a switching contact 1 of an electromechanical switching device 100, modified in comparison to the embodiment according to FIG. 1. In contrast to the embodiment according to FIG. 1, a concrete structure of a circuit assembly 10 is shown in which an evaluation and control unit 200 includes a microcontroller which has the functionality of a control unit 2011 for generating a clocked drive signal for driving or switching a semiconductor switch 2012 in the form of a MOSFET or the like. A coupling unit 202 is connected between the semiconductor switch 2012 and the switching contact 1, which essentially combines the functionality of a current limiter and the functionality of detecting and forwarding a signal. During an operating phase in which the switching state of the switching contacts 1 is being detected, a corresponding actuation signal is generated for the semiconductor switch 2012, so that a correspondingly clocked signal is generated via said semiconductor switch 2012 along the common current path with the switching contact 1—or the current path is closed and interrupted corresponding to the actuation signal of the semiconductor switch 2012. If the switching contact 1 is closed, a correspondingly clocked switching current is applied to it and a switching current $I_{switch}$ with reduced power dissipation is detected by the coupling unit 202 and forwarded to the evaluation unit 203 in the microcontroller for corresponding analysis. If the switching contact 1 is open and the common signal path P1 is thus interrupted, no switching current $I_{switch}$ is detected by the coupling unit 202 and this information is forwarded to the evaluation unit 203 in the microcontroller for corresponding analysis.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Switching contact
10 Circuit assembly
100 Electromechanical switching device
200 Evaluation and control unit
201 Clock signal generating device
2011 Control unit
2012 Semiconductor switch
202 Coupling unit
203 Evaluation unit
$U_{switch}$ Switching voltage (via switching contact)
$I_{switch}$ Switching current (through switching contact)
$T_{period}$ Period (control signal or switching signal)

The invention claimed is:

1. A method of detecting a switching state of a switching contact of an electromechanical switching device, the switching contact having at least one pair of contacts, during an operating phase for detecting the switching state, the method comprising:
   applying a switching current to the switching contact; and
   analyzing the switching current using an evaluation unit to determine whether the switching contact is in a closed switching state or in an open switching state,
   wherein the switching current in a form of a clocked voltage or current signal that is applied to the switching contact, and
   wherein a pulse-pause ratio of the switching current is varied subject to at least one operating parameter of the electromechanical switching device so that a reduction of power dissipation within the electromechanical switching device is operably coupled to a power dissipation generated in the electromechanical switching device.

2. The method of claim 1, wherein the switching current is in a form of a clocked square-wave signal,
   wherein a predefined maximum switching current is switched during a pulse phase and a predefined minimum switching current is switched during a pause phase, and
   wherein the predefined minimum switching current is 0 mA.

3. The method of claim 2, wherein the pulse-pause ratio is preset such that different rates are specifiable for detecting the switching state of the switching contact.

4. The method of claim 1, wherein the switching current is in a form of a clocked square-wave signal having the pulse-pause ratio.

5. The method of claim 1, wherein a period of the clocked voltage or current signal is varied subject to at least one operating parameter.

6. The method of claim 1, wherein, prior to applying the switching current in the form of the clocked voltage or current signal to the switching contact, a non-clocked switching current of fixed magnitude is applied to the switching contact for a predefined self-cleaning time.

7. A circuit assembly for detecting the switching state of a switching contact of an electromechanical switching device, comprising:
  an electromechanical switching device having at least one switching contact; and
  an evaluation and control unit configured to actuate the electromechanical switching device and to evaluate a switching current flowing through the at least one switching contact of the electromechanical switching device,
  wherein the evaluation and control unit is configured such that, during an operating phase for detecting the switching state of the switching contact, the switching current in a form of a clocked voltage or current signal is applicable to the at least one switching contact and the switching current is analyzable to determine whether the at least one switching contact is in a closed switching state or in an open switching state, and
  wherein a pulse-pause ratio of the switching current is variable subject to at least one operating parameter of the electromechanical switching device so that a reduction of power dissipation within the electromechanical switching device is operably coupled to a power dissipation generated in the electromechanical switching device.

8. The circuit assembly of claim 7, wherein the evaluation and control unit comprises:
  a clock signal generating device;
  a coupling unit; and
  an evaluation unit,
  wherein the at least one switching contact of the electromechanical switching device is connected in series with the clock signal generating device and the coupling unit along a common path between a switching voltage potential and ground, and
  wherein the circuit assembly is configured such that, during an operating cycle for detecting the switching state of the at least one switching contact, the switching current in the form of the clocked voltage or current signal is applicable to the at least one switching contact and the switching current flowing along the common path is analyzable by the evaluation unit to determine whether the at least one switching contact is in a closed switching state or in an open switching state.

9. The circuit assembly of claim 8, wherein the coupling unit is configured to ensure current limitation along the common path and to detect the switching current flowing across the at least one switching contact or a voltage applied across the at least one switching contact, and to supply a corresponding signal to the evaluation unit.

10. The circuit assembly of claim 7, wherein the clock signal generating device comprises a control unit and a semiconductor switch that is actuatable via the control unit.

* * * * *